United States Patent
Gupta et al.

(10) Patent No.: US 9,247,200 B2
(45) Date of Patent: Jan. 26, 2016

(54) CONTROLLED ENVIRONMENT FACILITY VIDEO VISITATION SYSTEMS AND METHODS

(71) Applicant: Centric Group LLC, St. Louis, MO (US)

(72) Inventors: Atul Gupta, Grimes, IA (US); Rahul Kapoor, Charlottesville, VA (US)

(73) Assignee: KEEFE GROUP, LLC, St. Louis, MO (US)

( * ) Notice: Subject to any disclaimer, the term of this patent is extended or adjusted under 35 U.S.C. 154(b) by 11 days.

(21) Appl. No.: 14/202,551

(22) Filed: Mar. 10, 2014

(65) Prior Publication Data

US 2014/0313275 A1     Oct. 23, 2014

Related U.S. Application Data (60) Provisional application No. 61/781,709, filed on Mar. 14, 2013.

(51) Int. Cl.
*H04N 7/14* (2006.01)

(52) U.S. Cl.
CPC ..................................... *H04N 7/141* (2013.01)

(58) Field of Classification Search
CPC ..................... H04Q 11/00; H04Q 2213/13103
USPC ........................................................ 348/14.08
See application file for complete search history.

(56) References Cited

U.S. PATENT DOCUMENTS

| | | | |
|---|---|---|---|
| 2008/0043644 A1* | 2/2008 | Barkley et al. | 370/261 |
| 2008/0303903 A1* | 12/2008 | Bentley et al. | 348/143 |
| 2009/0290023 A1* | 11/2009 | Lefort et al. | 348/151 |
| 2011/0069616 A1* | 3/2011 | Revels | 370/236 |
| 2013/0008948 A1* | 1/2013 | Aidasani et al. | 235/375 |
| 2013/0091582 A1* | 4/2013 | Chen et al. | 726/26 |
| 2013/0169809 A1* | 7/2013 | Grignan et al. | 348/148 |
| 2013/0279686 A1* | 10/2013 | Keiser et al. | 379/266.07 |

* cited by examiner

*Primary Examiner* — Creighton Smith
(74) *Attorney, Agent, or Firm* — Armstrong Teasdale LLP (57) ABSTRACT

Video visitation systems and methods for correctional facilities include an audio/video processor element interconnecting an inmate station and a remote visitor station. The audio/video processor element adjusts audio and/or video feeds to facilitate monitoring by a plurality of officers at remote monitoring stations without experiencing network bandwidth and latency issues.

64 Claims, 2 Drawing Sheets

CONTROLLED ENVIRONMENT FACILITY VIDEO VISITATION SYSTEMS AND METHODS

CROSS REFERENCE TO RELATED APPLICATIONS

This application claims the benefit of U.S. Provisional Patent Application Ser. No. 61/781,709 filed Mar. 14, 2013, the complete disclosure of which is hereby incorporated by reference in its entirety.

BACKGROUND OF THE INVENTION

The field of the invention relates generally to administrative systems for institutional environments, and more specifically to video visitation systems for correctional facilities.

Various types of institutional facilities are known that house residents in a controlled environment. Activities of residents in such controlled environments are restricted, and a high degree of supervision is exercised over the residents. As a result, significant administrative difficulties exist in such institutional environments that do not necessarily exist in other environments. Among such institutional environments housing residents in a controlled environment are hospitals, convalescent homes, long term care facilities, nursing homes, psychiatric facilities, rehabilitation facilities and developmental disability facilities, and correctional facilities such as prisons and jails housing incarcerated individuals, often referred to as inmates.

Correctional facilities such as jails and prisons allow inmates to visit with friends and family in-person as well as to communicate telephonically within predetermined limits. Visits with family and friends allow inmates to maintain those relationships despite incarceration. Such visits with family and friends are important to the mental wellbeing of inmates, and are a predominate factor in the rehabilitation and reentry of inmates into society upon their release from the correctional facility.

In-person visits with inmates at a correctional facility are therefore highly beneficial but present certain challenges to facility administrators. Such in-person visits have to be closely supervised to ensure the safety of visitors, to prevent contraband from being introduced into the institution, and to deter inmates from conducting or ordering nefarious activities in concert with a visitor, who may be knowing or unknowing of an inmate's intent to use them in a nefarious plan. Such concerns are typically manageable using known security protocols and procedures, but in view of the issues involved most correctional facilities can only accommodate a relatively small number of in-person visits at any given time. Some inconvenience on the part of visitors may result in their inability to visit with an inmate at certain times, and this can be an impediment to in-person visits even when the visitor lives relatively close to the correctional facility where the inmate is incarcerated.

When family, friends, and acquaintances live far away from a facility where an inmate is incarcerated, in-person visits may occur infrequently or may not occur at all. Time and costs to commute long distances to meet in-person with an inmate may render them prohibitive to certain family, friends and acquaintances that otherwise may be interested in maintaining a relationship with the inmates.

Telephonic communication allows more convenient communication across long distances, but tends to be less personal.

Improvements in facilitating meaningful contact between inmates and visitors at increased convenience to the visitors, and while alleviating the challenges of correctional facility administrators are desired.

BRIEF DESCRIPTION OF THE DRAWINGS

Non-limiting and non-exhaustive embodiments are described with reference to the following FIGS., wherein like reference numerals refer to like parts throughout the various views unless otherwise specified.

DETAILED DESCRIPTION OF THE INVENTION

In view of the problems in the art as discussed above, video conferencing technology operable over computer networks has the potential to provide richer communication between inmates and members of the public to conduct visitation sessions at an increased convenience. As the physical distance between visitor and inmate is usually not a restriction for video conferencing systems, more frequent and meaningful contact may be made via visits conducted by video conferencing for persons that live far apart from the inmate. Video conferencing technology also has potential to reduce some of the administrative challenges associated with accommodating and supervising local in-person visits. Video conferencing, however, presents additional challenges to correctional facilities that have yet to be overcome.

In the correctional facility context, implementing video visitation systems operating over computer networks presents a number of practical problems and concerns. Unlike video conferencing for the general market, implementing video conferencing in a controlled environment of a correctional facility involves unique problems relating to supervising video conferences between inmates and remote visitors. Therefore, despite recent advancements in video conferencing technology, it has yet to be fully embraced in many correctional facilities.

Due to network bandwidth limitations and network latency issues, in many instances any attempt to utilize existing video conference systems in a correctional facility would practically limit any monitoring of a video visit to a single officer in the same location as the inmate. Further, and also because of network bandwidth and latency issues, an officer can only typically monitor a single inmate/visitor video conference at a time. However, single officer monitoring of a single video conference is not practical or desirable in most correctional facilities, as the officer to inmate ratio would necessarily have to be undesirably, and sometimes prohibitively, high in order for video visitation with larger numbers of inmates to be properly monitored.

Allowing an inmate, a visitor, and more than one monitoring officer at different locations to access a video conference using existing equipment may be possible if the necessary network bandwidth is available (or could be made available) in any given correctional facility. A large network bandwidth would necessarily be required, and if available at all it likely would be prohibitively expensive for most correctional facilities. Even where the monitoring officer is in the same location as the inmate, network latency issues have tended to render the user experience to be subpar in the controlled environment of a correctional facility.

Exemplary video visitation systems and methods are described herein that overcome the issues discussed above in correctional facilities and other institutional environments posing similar issues.

Especially in the context of correctional facility implementations, the exemplary video visitation systems and methods described below desirably allow a number of officers located at either inmate or visitor locations to simultaneously monitor communications in a video visitation conference between an inmate and a visitor at a remote location. Multiple officers may simultaneously monitor the same video conference, and any of the officers may simultaneously monitor different video visitations between different inmates and visitors. The video visitation systems also allow a finite number (limited only by a facility's network bandwidth) of officers at a remote location(s) to monitor the communication. The video visitation systems further enable remote monitoring and/or playback of previously recorded communications. More video visitations may therefore be accommodated using a fewer number of officers to supervise them in comparison to existing technology and methods, more flexibility and convenience to visitors is presented in visiting with inmates, and administrative oversight may be shared across multiple officers and even officers in different jurisdictions. This is achieved at least in part by dynamically reducing the quality of the video and/or audio feed of the video visit. Method aspects will in part apparent and in part explicitly discussed in the description below.

Figure 1:
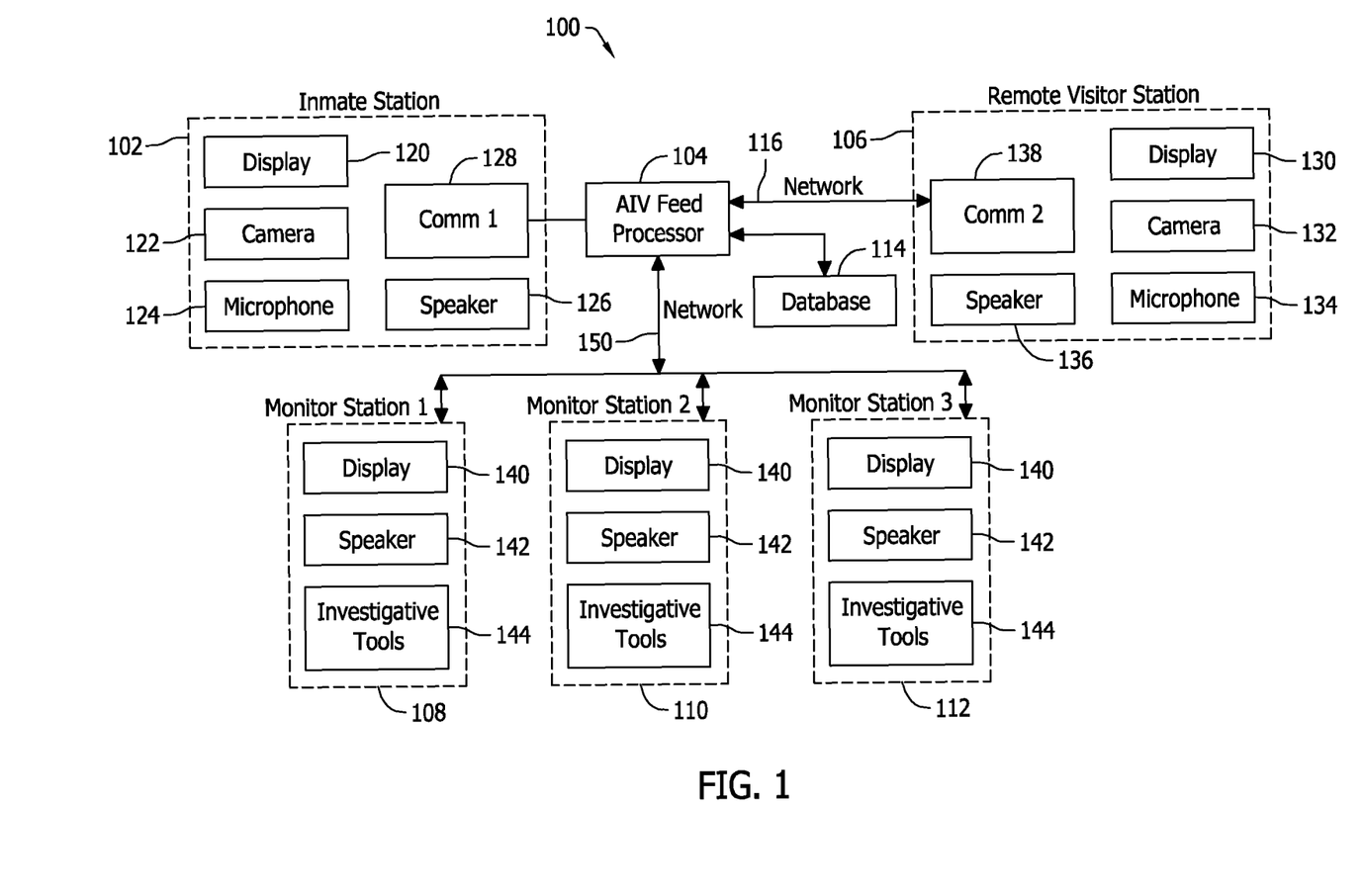
FIG. 1 is a block diagram of an exemplary video visitation system for an institution such as a correctional facility.

FIG. 1 illustrates an exemplary video conferencing system 100 configured for optimal use in an institution housing residents in a controlled environment such as a correctional facility. The system 100 includes at least one inmate station 102, a director element or device 104, at least one remote visitor station 106 and a plurality of remote monitoring stations 108, 110 and 112. The system 100 may also include a database 114.

In certain embodiments, the inmate station 102 and the visitor station 106 may each be located in predetermined and different locations in a correctional facility or other instructional facility housing residents in a controlled environment (whether the same or different facility from one another). As such, the inmate and visitors must each use dedicated workstations 102, 106 at the same or different correctional facility sites to conduct a visit.

In one exemplary embodiment, the inmate station 102 may be located at a first correctional facility where the inmate is incarcerated, and the visitor station 106 may be located at another, second correctional facility remote from the first facility but closer to where the visitor resides. That is, the visitor may commute a short distance to a local correctional facility, but still remote from the correction facility where the inmate is incarcerated, and use the visitor station 106 there to visit with the inmate at the inmate station 102 where he or she is incarcerated.

In another exemplary embodiment, the visitor may attend a correctional facility remote to both his or her residence and the correctional facility where the inmate is located, and use the visitor station 106 there to visit with the inmate at the inmate station 102 where he or she is incarcerated. This may be particularly convenient when the visitor is away from home (e.g., on vacation or on a business trip) but still wishes to visit with an inmate at a nearby facility that is still remote from the correctional facility where the inmate is incarcerated.

In another exemplary embodiment, the visitor may come to the facility where the inmate is incarcerated and use the visitor station 106 to visit with the inmate via the inmate station 102 where he or she is incarcerated.

In still another exemplary embodiment, the visitor could be at his or her home and still conduct a video visit with an inmate at the inmate station 102 where he or she is incarcerated.

As illustrated in the exemplary embodiments discussed above, the remote visitor station 106 could be located at any desired location provided that it is properly equipped for interacting with the remainder of the system 100 and the inmate station 102 where the inmate is located in the advantageous manner explained below. Likewise, the inmate station 102 could be located at any desired location provided that it is properly equipped for interacting with the remainder of the system 100 and the visitor station 106. The inmate could potentially use an inmate station 102 that is not located at the correctional facility where he or she is incarcerated.

The inmate station 102 includes a display 120, a camera 122, a microphone 124, a speaker 126, and a communications element 128 providing an audio/video (A/V) output and interfacing to the visitor station 106. The microphone 124 and speaker 126 may in some embodiments be provided as a combination in the form of a handset, similar to the handset provided on a public phone in a correctional facility. Such a handset may allow for enhanced privacy and can be easily cleaned after use. In other embodiments the components 120, 122, 124, 126 and 128 of the inmate station 102 may be packaged in a single computer device or may be a combination of separately provided components 120, 122, 124, 126 and 128.

The remote visitor station 106 includes a display 130, a camera 132, a microphone 134, a speaker 136, and a communications element 138 also providing A/V output and interfacing to the inmate station 102. The microphone 134 and speaker 136 at the visitor station 106 may in some embodiments be provided as a combination in the form of a handset, similar to the handset provided on a public phone in a correctional facility. Such a handset may allow for enhanced privacy and can be easily cleaned after use. In other embodiments the components 130, 132, 134, 136 and 138 of the visitor station 104 may be packaged in a single computer device or may be a combination of separately provided components 130, 132, 134, 136 and 138.

Using the stations 102 and 106, the inmate and the visitor may communicate while seeing and hearing one another using the visual and audio feeds generated at each station 102, 106 and transmitted to the other station 102 or 106 using a communications network 116 that may include, but is not limited to the Internet. Local area networks and other computer networks, as well as Wi-Fi connections and the like, may be used to link the two stations 102 and 106 and facilitate the conference. While one inmate station 102 and one visitor station 106 are shown in FIG. 1, multiple inmate stations and multiple visitor stations 106 may be provided to simultaneously conduct video visitations between different inmates and visitors. In such a scenario, multiple systems 100 may be provided at a correctional facility that are independently operable, or the system 100 may be expanded to include multiple inmate and visitor stations 102, 106 interfacing with a common director element 104.

In exemplary embodiments, the processing director element or director device 104 is provided as an external device to each of the inmate and visitor workstations 102 and 106. The director device 104 is responsible for recording and tracking schedules as well as directing A/V content to devices outside the local network of the correctional facility. In an installation wherein the inmate and visitor workstations 102, 106 are at the same facility, the workstations 102, 106 and perhaps the monitor stations 108, 110, 112 may communicate directly with one another without involving the director element 104.

When one of the stations 108, 110 and 112 is remotely located outside the correctional facility where the inmate station 102 is located, any remotely located station communicates with the director device 104 and indirectly with the local workstation 102 and other local workstations. The director device 104 is shown in FIG. 1 communicating with the stations 108, 100 and 112 via a network 150. The network 150 may, in any particular implementation, however, be the same network or a different network from the network 116 shown between the director device 104 and the visitor station 106. Any networking technology may be used to establish the connections needed for the system to operate.

The director device 104 may be a processor-based device including a processor and a memory for storing instructions, control algorithms and other information as required for the system 100 to function in the manner described. The memory may be, for example, a random access memory (RAM), or other forms of memory used in conjunction with RAM memory, including but not limited to flash memory (FLASH), programmable read only memory (PROM), and electronically erasable programmable read only memory (EEPROM). Alternatively, non-processor based electronics and circuitry may be provided in the device 104 with equal effect to serve similar objectives.

As used herein, the term "processor-based device" shall refer to devices including a processor or microprocessor as described for controlling the functionality of the device, but also other equivalent elements such as, microcontrollers, microcomputers, programmable logic controllers, reduced instruction set (RISC) circuits, application specific integrated circuits and other programmable circuits, logic circuits, equivalents thereof, and any other circuit or processor capable of executing the functions described below. The processor-based devices listed above are exemplary only, and are thus not intended to limit in any way the definition and/or meaning of the term "processor-based device."

The director element 104 may be provided as a stand-alone device or as part of a correctional facility administration system including other functionality such as inmate registration and privilege administration, funding and/or managing inmate financial accounts, scheduling and coordinating inmate activities, managing telephonic communications and monitoring of the same, managing inmate email communications, managing commissary purchases and other aspects of administrating a correctional facility. In various embodiments, the director element 104 may be located on site to the correctional facility where the inmate station 102 is located, or may be located remotely. The director element 104 may be implemented as a server accessible over the networks 116, 150. In some embodiments, the director element 104 may be integrated in the inmate station 102. More than one director element 104 may be provided if desired.

In contemplated embodiments, each inmate and visitor workstation 102, 106 is configured to perform audio/video (A/V) processing to facilitate monitoring of the video visitation by one or more officers via the director element 104 as further explained below. More specifically, each inmate and visitor workstation 102, 106 includes processor-based devices or elements that are respectively configured to dynamically adjust the video and audio feeds of the video conference conducted between the inmate and visitor to facilitate monitoring of the video conference by officers at more than one location via the monitoring stations 108, 110 and 112. In one embodiment, the A/V processing elements are the Comm elements 128, 138 in the illustrated example of FIG. 1. It is understood, however, that A/V processing elements or systems could be provided elsewhere in the workstations 102, 106. It is further contemplated that the A/V processing elements could in some embodiments be separately provided devices interfacing the workstations 102, 106 with the director element 104.

The director element 104 which receives each dynamically adjusted audio and video feed from the workstations 102, 106 also facilitates video and audio recording and playback of a recorded video conference at remote locations. The video and audio feeds output from each workstation 102, 106 may be reduced from a higher quality form to a lower quality form that is less data intensive and thus may be viewed over reduced bandwidth networks and while reducing network latency issues.

In one example, the video feed at its highest quality includes every frame of video captured by the video camera(s) 122, 132 of the system 100. While this is perhaps the most desirable form of the video feed, it can at times be cumbersome and data intensive to successfully view over certain networks at certain times. Therefore, the A/V processing element at the workstations 102, 106 is provided so that the highest quality video feed may be converted to a more manageable form that may be more successfully viewed, stored and accessed via the various networks associated with the system 100.

In one contemplated embodiment, the A/V processing element at each workstation 102, 106 is operable to reduce the quality of the video feed to include less that all of the frames captured by the video camera 122, 132 at each station 102, 106. By reducing the quality of the video feed, network bandwidth and latency issues may be dramatically reduced, if not eliminated while conducting video conferences, including a number of officers monitoring the conferences from different locations.

In a first type of video quality reduction scheme, a single video frame is removed from the video feed by the A/V processing element at the workstations 102, 106 on a regular and reoccurring basis or intervals. As an illustrative example of this type, every third frame of video may be removed from the video feed that is captured at each workstation 102, 106. Thus, following this example, in a successive frame video feed beginning at frame zero, the third frame, the sixth frame, the ninth frame, etc. may be removed from the video feed at each station 102, 106. For any given length of video in this example, a 33% reduction in the frames transmitted is accomplished. The result may be reliably transmitted over a lower bandwidth network and with less latency issues than the highest quality video including all of the video frames.

Significant size reduction for storage and playback of recorded video conferences is also realized with the system 100. In the above example, removing every third frame in the video feed provides a 33% reduction in the file size of the recorded video. The resultant video feed to be broadcast, stored or replayed is of a lower quality and may have a choppy effect when viewed live or from the recorded version, but is nonetheless of a sufficient quality to carry on a conversation or to effectively monitor a video conference visitation. Even though frames have been removed, and thus create gaps in the video feed, the human eye and ear can still readily follow the communications occurring in the visit between inmate and remote visitor. The gaps (i.e., the removed video frames) effectively skip the video forward in time as the viewer sees it, or is akin to a spliced film reel where a certain portion of the film has been removed. At some times in the reduced video feed this may be practically imperceptible to the viewer, at other times it may be apparent, but as long as the gaps are not too large the viewer will have no trouble understanding the video footage that remains.

Fine adjustment in the reduced quality of the feed as adjusted by the A/V processing elements are possible. For example, every fourth video frame may be removed for a 25% reduction in video file size relative to a full quality video containing all frames. The 25% reduction will be slightly less choppy than the 33% version. As another example, every fifth video frame may be removed for a 20% reduction in video file size relative to a full quality video containing all frames, and accordingly will be will be slightly less choppy than the 25% version. As still another example, every tenth video frame may be removed for a 10% reduction in video file size relative to a full quality video containing all frames, and accordingly will be will be less choppy than the 25% version. Especially for larger correctional facilities having a larger number of possible video visitations occurring at the same time, even small reductions in the video feeds can lead to significantly better performance. The amount of reduction may be arbitrarily selected, may be empirically determined, or may be predictively set by the correctional facility administrators based on usage requirements, available bandwidth, cost and other factors.

As still other variations, more than one successive frame of video may be removed to reduce the quality of the video feed by the A/V processing elements at the workstations 102, 106. For example, instead of removing every single third frame of video, two frames of video could be removed after every sixth frame and an equal reduction in video data output from the A/V processing element would result.

As another example, instead of removing every fifth frame of a video, for a feed having multiple segments of video including a series of frames numbered zero through 9, frames 5 and 6 could be removed while retaining frames zero to 4 and frames 7-9 in each series while still achieving a 20% reduction in video data to broadcast, store or replay the video.

In either of the above scenarios, the choppiness of the video may be more pronounced than if single frames of video were removed in a more regular, recurring fashion, but the reduced quality of the video still may be of sufficient quality to carry on a conversation or to effectively monitor the video visitation.

Combinations of the above video feed quality reduction schemes are also possible. For example, in a first series of video frames every third frame may be removed from the video, while in a second series of frames more than one successive frame of video may be removed to reduce the quality of the video feed in a non-uniform manner between different series of video frames. The first series of frames (e.g., a group of ten successive frames) and the second series of frames (e.g., a group of twenty successive frames) may be the same or different number in such an embodiment. In other words, the gaps in the resultant video output from the A/V processing element may alternate between smaller gaps and larger gaps depending on how many frames are removed that result in each gap.

In a similar vein, the audio feed at its highest quality includes every bit of audio captured by the microphone at each station 102, 106. When the highest quality audio feed is reduced by the A/V processing at the stations 102, 106 is adjusted, however, to include less that all of the audio captured by the microphones, network bandwidth and latency issues may be dramatically reduced. For example, in one contemplated embodiment, audio associated with every third frame of video may be removed from the audio feed output to the director device 104 and made available for live remote listening and recorded for subsequent playback. For any given length of video, a significant reduction in the audio feed transmitted is accomplished. The result may be reliably transmitted over a lower bandwidth network and with less latency issues than the highest quality audio feed. Significant size reduction in the audio aspects for storage and playback of recorded video conferences is also realized.

In contemplated embodiments, the audio and video feeds may be reduced with the A/V processing elements at the workstations 102, 106 by corresponding amounts in a simultaneous fashion. That is, if 20% of the video frames are removed then a corresponding 20% of the audio is also removed. The amount of the video and audio reduction may be predetermined in the video visitation system design or may be selected by a user.

In other embodiments, the audio and video feeds may be reduced by the A/V processing elements at different rates, although if this is done the audio and video will become increasing out of synchrony as the audio/video file is broadcast, stored, and replayed if no compensation is provided by the A/V processing elements. In certain embodiments, the A/V processing elements may supply compensation to avoid this result. Possible compensation may include appropriate intermittent delays in the smaller of the two feeds to prevent it from running away from the fuller feed, or alternatively allowing the fuller feed to catch up to the reduced feed. In such compensation, while the reduced feed is delayed the fuller feed may continue to play, and after the delay expires the reduced feed again plays in a substantially synchronized manner with the fuller feed until another delay is commenced. Using time-based delays, asynchronization of the video and audio feeds may be avoided even though they are not reduced by the same amount in the A/V processing elements. The resultant video and audio feeds adjusted by the A/V processing elements may be broadcast, stored or replayed to reduce the bandwidth requirements or to overcome latency issues of the network that would otherwise be encountered when using full quality feeds.

In still other embodiments, the A/V processing elements may intelligently analyze the video and our/audio feeds to determine where the gaps in the video and audio are most desirably placed. For example, the A/V processing elements could monitor the audio feed and determine periods where words are not spoken (i.e., where both parties are silent), and then remove the audio and video frames corresponding to the silent portions. Likewise, the video feed could be monitored and, for example, if one of the inmates and visitors moves out of the field of the respective camera view, the corresponding video frames and audio could be removed by the A/V processing elements. Appropriate caution should be exercised in such embodiments so as to not render the system 100 vulnerable to manipulation by inmates or visitors who may cease to communicate verbally but continue to communicate visually (i.e., non-verbally), or vice-versa. Also, accommodations should be made so that, in the event that one of the inmates and visitors appropriately utilizes sign language, the sign language is captured in the video conference and is not removed.

In contemplated embodiments, the A/V processing elements may intelligently detect or deduce network issues and may control video and audio feed adjustment on demand as needs dictate. As such, the A/V processing elements may sometimes adjust video and/or audio feeds while at other times they may not. The A/V processing elements may also adjust video and/or audio feeds at different rates or amounts for conferences conducted at different times. As one example, when simultaneous video conferences are being conducted at a given facility, the network issues may become more likely and the A/V processing elements may need to adjust the video and audio feeds to a greater extent than if only one conference was being conducted. As another example, certain times of day may be more likely to present bandwidth issues than others, and the A/V processing elements may accordingly vary the amount of video and/or audio feed adjustment depending on the time of day that a conference is conducted. The A/V processing elements, either on their own or in combination with other correctional facility systems, may proactively schedule and manage the times of video conferences with such considerations in mind. In some embodiments, the director element 104 may also in whole or in part assist with proactive scheduling and management of video conferences.

In still other contemplated embodiments, network analytics and the like may be made available to the A/V processing elements, and the A/V processing elements may adjust video and/or audio feeds to optimal amounts depending on actual operating conditions of one or more networks utilized to conduct the conference. The A/V processing elements and the director element 104, either on their own or in combination with other correctional facility systems, may proactively schedule and manage the times of video conferences with actual performance considerations of one or more networks in mind. The A/V processing elements may therefore operate dynamically and be self-adjusting or may operate according to user preferences, which may be empirically or experimentally determined for the particulars of each correctional facility and its networks.

In still other embodiments, one of the audio and video feeds may be reduced in the A/V processing elements while the other is not. That is, the video feed may be full quality (i.e., no video frames removed) while the audio feed has portions removed by the A/V processing elements, or the video feed may be reduced (i.e., have frames removed) while the audio is full quality. Again, however, this will result in asynchronous audio and video if compensation is not provided.

By virtue of the reduced video and/or reduced audio feed techniques described above and implemented with the A/V processing elements, bandwidth requirements of the video conference are reduced and so are latency issues. Thus, more officers may join a video conference from different locations without creating bandwidth issues and without experiencing latency issues that impair their ability to efficiently monitor the communications on the video conference.

The monitoring stations 108, 110 and 112 may each include a display 140, a speaker 142 and investigative tools 144. Each of the monitoring stations 108, 110 and 112 may also include a microphone and a camera, but these are not required for monitoring purposes.

The monitoring stations 108, 110 and 112 may each be packaged in a single computer device or alternatively may each be a combination of separately provided components. The monitoring stations 108, 110 and 112 may concurrently interface with multiple pairs of inmate and visitor workstations 102 and 106 via a communications network 150 that may be the same or different from the network 116 associated with the remote inmate system 102 or remote visitation system 106. The director unit 104 may also record the video conference in memory storage, whether provided with or separately provided form the director unit 104. Recorded video conferences may be stored in and may be accessed from the database 114 for subsequent retrieval and review.

When more than director element 104 is provided, the video conference including the adjusted video and audio feeds may be recorded by one of the director elements 104 or by director elements 104 in multiple locations. For example, a video visitation session may be recorded by a director device 104 at the facility where the inmate station 102 is located and also be a director element 104 at the facility where the visitor station 106 is located. Storing of the recorded conferences in multiple devices 104 at different locations may be desirable because the recorded video visitations session may be accessed for playback locally at each of the locations. Local streaming of the audio/video feed may sometimes be preferred to remote streaming of the audio/video feed from another location. While each correctional facility may be expected to record video visitation sessions involving inmates using the inmate stations 102 provided at the facility, each correctional facility may decide whether to record a video visitation involving a visitor using one of the visitor stations 106 to visit with an inmate at another facility.

In certain embodiments, the monitor stations 108, 110 and 112 are each configured to allow respective officers to remotely access and monitor a video visitation session. In addition, in one exemplary embodiment the stations 108, 110 and 112 are configured so that a single officer may monitor up to eight video conferences simultaneously. With a large display 140 at each monitor station 108, 110 and 112 up to sixteen different conferences can be simultaneously monitored by an officer at each station 108, 110 and 112. In various embodiments greater or fewer numbers of video visitations may be monitored.

The system 100 also allows multiple officers at the monitor stations 108, 110 and 112 to concurrently monitor the same video conference(s). The system 100 also indicates to each officer at the stations 108, 110 and 112 if a particular conference is being monitored by another officer.

The investigative tools 144 in the monitoring stations 108, 110 and 112 may be any of a variety of tools known in the art to analyze, assess and identify particular content of the communications between inmate and remote visitor of interest to an investigator. The investigative tools may be software-based modules running at the monitor stations or may be separately provided. As the monitoring officers are watching and listening to the video conference between the remote visitor and inmate, the investigative tools 144 are accessible and conveniently utilized. In certain embodiments, one or more of the investigative tools 144 may be automated and operate without input by an officer or investigator. The investigative tools 144 may be configured for example to flag and identify key words in a conversation, recognize names of persons of interest to an ongoing investigation, identify threats that may be made, etc. The investigative tools 144 may also be manually operated, and thus if a monitoring officer hears a keyword that is spoken, or otherwise wishes to make a note regarding something of interest, the tools 144 facilitate that marking or annotating of the contents of the visit for later review.

Figure 2:
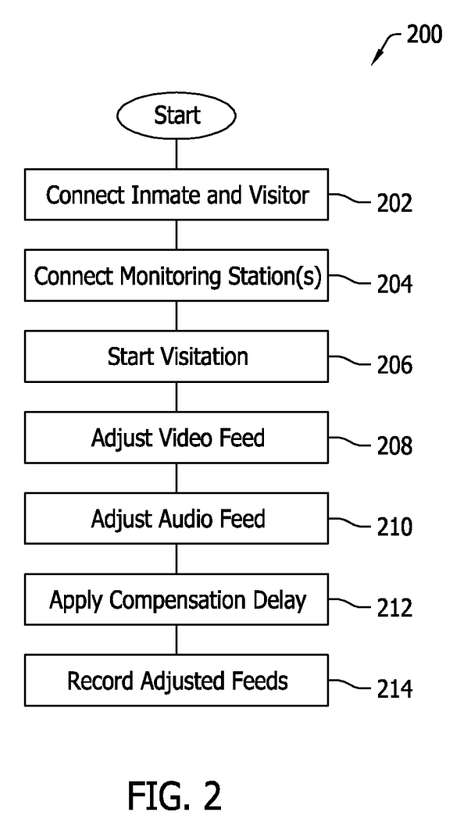
FIG. 2 is a flow chart of an exemplary method of conducting a video visitation system shown in FIG. 1.

FIG. 2 illustrates an exemplary method 200 of hosting a video conference in a correctional facility. At step 202 the inmate and visitor stations 102 and 106 are connected, and at step 204 the monitoring stations 108, 110 and 112 are connected. The connection at step 204 may occur simultaneously with the connection at step 202. The steps 202, 204 may include log-in and identity verification features, including biometric evaluation to evaluate at least the inmate's identity. The connections at steps 202 may also relate to how the video conference is being billed. In various examples, the video conference may be prepaid, billed to the inmate or billed to the visitor with appropriate notifications and authorizations made, solicited or accepted as the parties are being connected.

At step 206 the video conference starts and the inmate and the remote visitor may see, hear and interact with one another.

At step 208, the A/V processing elements adjust the video feed as described above, either dynamically or according to user provided settings or preferences. At step 210, the A/V processing elements adjust the audio feed as described above. At step 212 any compensation is made to the adjusted video and audio feeds to avoid asynchrony as described above.

At step 214, the adjusted video and audio feeds are recorded, including any compensation applied by the A/V processing elements via the director element 104. The reduced video and audio feeds made possible by the A/V processing further reduce the file size of recorded video conferences, and facilitate remote retrieval and reply by persons at different locations via the director element 104 for further monitoring or potentially for investigative reasons.

It is recognized that adaptations are possible and the certain of the steps described could be considered optional. For example, the compensation of step 212 may at times be unnecessary and accordingly step 212 may in some embodiments be omitted. Also, it is recognized that the steps need not necessarily be performed in the order shown, and that additional steps may be performed.

The systems and processes of the invention are not limited to the specific embodiments described herein. Components of each system and each process can be practiced independent and separate from other components and processes described herein. Each component and process also can be used in combination with other components, systems and processes. Varying degrees of complexity and functionality may be provided for cost management reasons and to meet the needs of particular users. It should now be apparent that the system components and functionality may be mixed and matched to generate varying systems which obtain the benefits of the present invention to varying degrees.

The benefits of the inventive concepts are now believed to be evident in view of the exemplary embodiments disclosed.

An embodiment of a video visitation system has been disclosed comprising: a first workstation comprising a first camera and a first microphone configured to generate a first complete audio/video feed; a second workstation comprising a second camera and a second microphone configured to generate a second complete audio/video feed; the first and second workstations configured to communicate with one another over at least one network, whereby a video visitation may be conducted between a first user at the first workstation and a second user at the second workstation; and at least one processor-based audio/video element configured to remove at least a portion of at least one of the first and second complete audio/video feeds.

Optionally, the at least one processor-based audio/video element is provided integrally with the first workstation. The first workstation may be an inmate workstation provided in a correctional facility. The video visitation system may further include a director element configured to communicate with the first and second workstations. The director element may include the at least one processor-based audio/video element. The director element may be configured to record the first and second audio/video feeds after the portion has been removed. The video visitation system may further include a database to store the recorded first and second audio/video feeds after the portion has been removed, and the at least one audio/video processing device may be configured to retrieve the stored recorded first and second audio/video feeds for subsequent playback.

The video visitation system may further optionally include at least one monitoring station configured to communicate with the director element. The monitoring station may be provided with investigative tools for analyzing the first and second audio feeds.

Each of the first and second complete audio/video feeds may include a video feed having a series of successive frames, and the at least one processor based audio/video element may be configured to remove frames from at least one of the first and second complete audio/video feeds. The at least one processor based audio/video element may be configured to remove a frame of a video feed at a predetermined and regular interval in the series of successive frames. The at least one processor based audio/video element may be configured to remove a plurality of successive frames in the series of successive frames. Each of the first and second complete audio/video feeds may include an audio feed corresponding to the video feed, and the at least one processor based audio/video element is configured to monitor the audio feed to determine the frames to be removed.

The at least one processor based audio/video element may be configured to dynamically adjust the removal of the frames based on network analytic considerations. The at least one processor based audio/video element may also configured to adjust the removed of the frames based on a time of day that the first and second workstations are in use.

Each of the first and second complete audio/video feeds may include an audio feed corresponding to the video feed, and the at least one processor based audio/video element is configured to remove a portion of the audio feed. The at least one processor based audio/video element may be configured to remove a portion of the audio feed corresponding to the removed video frames. The at least one processor based audio/video element may be configured to remove a portion of the audio that does not correspond to the removed video frames, and the at least one processor based audio/video element may be configured to delay one of the audio and video feeds with the portions removed to obtain synchronicity of the audio and video feeds with the portions removed.

At least the first workstation is located in an institutional facility that houses residents in a controlled environment. The institutional facility may be a correctional facility, The first workstation may be provided with biometric identification tools to authorize access to the first workstation.

The system may include at least one monitoring station, and the at least one monitoring station configured to provide simultaneous video visitations for review by a person at the at least one monitoring station. The at least one monitoring station may be configured to provide simultaneous review of eight or less video visitations by a single person at the least one monitoring station. The first workstation may be located in a correctional facility, the first user may be an inmate, and the single person may be an officer.

The first workstation may be located in an institutional facility housing residents in a controlled manner, and the first user may be a resident of the institutional facility. The institutional facility may be a correctional facility, and the first user may be an inmate.

A video visitation method has also been disclosed. The method is implemented with a system including a first workstation including a first camera and a first microphone configured to provide a first complete audio/video feed, a second workstation including a second camera and a second microphone configured to provide a second complete audio/video feed, the first and second workstations configured to communicate with one another over at least one network and provide a video visitation between a first user and a second user, and at least one processor-based audio/video element. The method includes: removing, with the at least one processor-based audio/video element, at least a portion of at least one of the first and second complete audio/video feeds.

The at least one processor-based audio/video element is optionally provided integrally with one of the first and second workstations, and the method optionally includes: removing a portion of at the complete audio/video feed at the one of the first and second workstations; and communicating the audio/video feed with the portion removed to the other of the first and second workstations.

The first workstation may be an inmate workstation provided in a correctional facility, wherein the first user is an inmate, and the method may further include accepting an inmate login.

The system may include a director element configured to communicate with the first and second workstations, and the method may include interfacing each of the first and second workstations with the director element. The method may also include scheduling a video visitation with the director element. The method may include recording the first and second audio/video feeds after the portion has been removed. The method may include: storing the recorded first and second audio/video feeds after the portion has been removed; and retrieving the stored recorded first and second audio/video feeds for subsequent playback.

The system may include at least one monitoring station configured to communicate with the director element, and the method may include receiving the first and second audio/video feeds with the at least one monitoring station after the portion has been removed. The monitoring station may be provided with investigative tools for analyzing the first and second audio feeds, and the method may include analyzing the first and second audio/video feeds with the investigative tools.

Each of the first and second complete audio/video feeds may include a video feed having a series of successive frames, and the method may include removing frames from at least one of the first and second complete audio feeds with the at least one processor based audio/video element. The method may include removing a frame of a video feed at a predetermined and regular interval in the series of successive frames. The method may include removing a plurality of successive frames in the series of successive frames.

Each of the first and second complete audio/video feeds may also include an audio feed corresponding to the video feed, and the method may include monitoring the audio feed, with the at least one processor based audio/video element, to determine the frames to be removed. The method may also include dynamically adjusting, with the at least one processor based audio/video element, the removal of the frames based on network analytic considerations for the network. The method may include adjusting the removed of the frames, with the at least one processor based audio/video element, based on a time of day that the first and second workstations are in use.

Each of the first and second complete audio/video feeds may include an audio feed corresponding to the video feed, and the method may include removing a portion of the audio feed with the at least one processor based audio/video element. The method may include removing a portion of the audio feed corresponding to the removed video frames. The method may include removing a portion of the audio that does not correspond to the removed video frames, and delaying one of the audio and video feeds with the portions removed to obtain synchronicity of the audio and feeds with the portions removed.

At least the first workstation may be located in an institutional facility that houses residents in a controlled environment, and the method may include billing a use of the system by at least one of the residents. The institutional facility may be a correctional facility, and the method may include accepting a logon from at least one inmate in the correctional facility. The method may include applying biometric identification tools to authorize access to the first workstation.

The system may include a plurality of monitoring stations at different locations remote from at least one of the first and second workstations, and the method may include dynamically adjusting the audio video feeds of at least one of the first and second workstations to facilitate monitoring of the video visitation by a person at each of the plurality of monitoring stations.

The system may include a plurality of first workstations and a plurality of second workstations. The system may include at least one monitoring station, the method may include providing simultaneous video visitations for review by a person at the at least one monitoring station.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A video visitation system comprising:
   a first workstation comprising a first camera and a first microphone configured to generate a first complete audio/video feed;
   a second workstation comprising a second camera and a second microphone configured to generate a second complete audio/video feed;
   the first and second workstations configured to communicate with one another over at least one network, whereby a video visitation may be conducted between a first user at the first workstation and a second user at the second workstation;
   at least one processor-based audio/video element configured to remove at least a portion of at least one of the first and second complete audio/video feeds; and
   a director element configured to communicate with the first and second workstations, wherein the director element is configured to record the first and second audio/video feeds after the portion of at least one of the first and second complete audio/video feeds has been removed.

2. The video visitation system of claim 1, wherein the at least one processor-based audio/video element is provided integrally with the first workstation.

3. The video visitation system of claim 1, wherein the first workstation is an inmate workstation provided in a correctional facility.

4. The video visitation system of claim 1, wherein the director element includes the at least one processor-based audio/video element.

5. The video visitation system of claim 1, further comprising a database to store the recorded first and second audio/video feeds after the portion has been removed, and the at least one processor-based audio/video element configured to retrieve the stored recorded first and second audio/video feeds for subsequent playback.

6. The video visitation system of claim 1, further comprising at least one monitoring station configured to communicate with the director element.

7. The video visitation system of claim 6, wherein the at least one monitoring station is provided with investigative tools for analyzing the first and second audio feeds.

8. The video visitation system of claim 1, wherein the first and second complete audio/video feeds respectively comprises a first video feed and a second video feed each having a series of successive frames, and wherein the at least one processor-based audio/video element is configured to remove frames from at least one of the first video feed and the second video feed.

9. The video visitation system of claim 8, wherein the at least one processor-based audio/video element is configured to remove a frame of at least one of the first and second video feeds at a predetermined and regular interval in the series of successive frames.

10. The video visitation system of claim 8, wherein the at least one processor-based audio/video element is configured to remove a plurality of successive frames in the series of successive frames in at least one of the first and second video feeds.

11. The video visitation system of claim 8, wherein each of the first and second complete audio/video feeds comprises an audio feed corresponding to the respective video feed, and the at least one processor-based audio/video element is configured to monitor the audio feed to determine the frames to be removed.

12. The video visitation system of claim 8, wherein the at least one processor-based audio/video element is configured to dynamically adjust the removal of the frames based on network analytic considerations.

13. The video visitation system of claim 8, wherein the at least one processor-based audio/video element is configured to adjust the removed of the frames based on a time of day that the first and second workstations are in use.

14. The video visitation system of claim 8, wherein each of the first and second complete audio/video feeds comprises an audio feed corresponding to the video feed, and wherein the at least one processor-based audio/video element is configured to remove a portion of the audio feed.

15. The video visitation system of claim 14, wherein the at least one processor-based audio/video element is configured to remove a portion of the audio feed corresponding to the removed video frames.

16. The video visitation system of claim 14, wherein the at least one processor-based audio/video element is configured to remove a portion of the audio that does not correspond to the removed video frames, and the at least one processor-based audio/video element is configured to delay one of the audio and video feeds with the portions removed to obtain synchronicity of the audio and video feeds with the portions removed.

17. The video visitation system of claim 8, wherein at least the first workstation is located in an institutional facility that houses residents in a controlled environment.

18. The video visitation system of claim 17, wherein the institutional facility is a correctional facility.

19. The video visitation of claim 1, wherein the first workstation is provided with biometric identification tools to authorize access to the first workstation.

20. A video visitation method, the method implemented with a system including a first workstation comprising a first camera and a first microphone configured to provide a first complete audio/video feed, a second workstation comprising a second camera and a second microphone configured to provide a second complete audio/video feed, the first and second workstations configured to communicate with one another over at least one network and provide a video visitation between a first user and a second user, and at least one processor-based audio/video element, the method comprising:

removing, with the at least one processor-based audio/video element, at least a portion of at least one of the first and second complete audio/video feeds; and recording the first and second audio/video feeds after the portion has been removed.

21. The method of claim 20, wherein the at least one processor-based audio/video element is provided integrally with one of the first and second workstations, and the method comprises:

removing a portion of at the complete audio/video feed at the one of the first and second workstations; and communicating the audio/video feed with the portion removed to the other of the first and second workstations.

22. The method of claim 20, wherein the first workstation is an inmate workstation provided in a correctional facility, wherein the first user is an inmate, and the method further comprises accepting an inmate login.

23. The method of claim 20, the system further including a director element configured to communicate with the first and second workstations, and the method comprising interfacing each of the first and second workstations with the director element.

24. The method of claim 23, further comprising scheduling a video visitation with the director element.

25. The method of claim 20, further comprising:

storing the recorded first and second audio/video feeds after the portion has been removed; and retrieving the stored recorded first and second audio/video feeds for subsequent playback.

26. The method of claim 23, the system further including at least one monitoring station configured to communicate with the director element, and the method comprising receiving the first and second audio/video feeds with the at least one monitoring station after the portion has been removed.

27. The method of claim 26, wherein the at least one monitoring station is provided with investigative tools for analyzing the first and second audio feeds, the method further comprising analyzing the first and second audio/video feeds with the investigative tools.

28. The method of claim 20, wherein each of the first and second complete audio/video feeds includes a video feed having a series of successive frames, and the method comprises removing frames from at least one of the first and second complete audio feeds with the at least one processor-based audio/video element.

29. The method of claim 28, wherein removing frames from at least one of the first and second complete audio feeds comprises removing a frame of a video feed at a predetermined and regular interval in the series of successive frames.

30. The method of claim 28, wherein removing frames from at least one of the first and second complete audio feeds comprises removing a plurality of successive frames in the series of successive frames.

31. The method of claim 28, wherein each of the first and second complete audio/video feeds comprises an audio feed corresponding to the video feed, and the method further comprises monitoring the audio feed, with the at least one processor-based audio/video element, to determine the frames to be removed.

32. The method of claim 28, the method further comprising dynamically adjusting, with the at least one processor-based audio/video element, the removal of the frames based on network analytic considerations for the network.

33. The method of claim 28, the method further comprising adjusting the removed of the frames, with the at least one processor-based audio/video element, based on a time of day that the first and second workstations are in use.

34. The method of claim 28, wherein each of the first and second complete audio/video feeds comprises an audio feed corresponding to the video feed, and the method comprises removing a portion of the audio feed with the at least one processor-based audio/video element.

35. The method of claim 34, the method comprising removing a portion of the audio feed corresponding to the removed video frames.

36. The method of claim 34, further comprising removing a portion of the audio that does not correspond to the removed video frames, and delaying one of the audio and video feeds with the portions removed to obtain synchronicity of the audio and feeds with the portions removed.

37. The method of claim 28, wherein at least the first workstation is located in an institutional facility that houses residents in a controlled environment, and the method comprises billing a use of the system by at least one of the residents.

38. The method of claim 37, wherein the institutional facility is a correctional facility, and the method includes accepting a logon from at least one inmate in the correctional facility.

39. The method of claim 28, the method comprising applying biometric identification tools to authorize access to the first workstation.

40. The method of claim 22, the system including a plurality of monitoring stations at different locations remote from at least one of the first and second workstations, the method comprising dynamically adjusting the audio video feeds of at least one of the first and second workstations to facilitate monitoring of the video visitation by a person at each of the plurality of monitoring stations.

41. The method of claim 20, the system including a plurality of first workstations and a plurality of second workstations, the system further including at least one monitoring station, the method comprising providing simultaneous video visitations for review by a person at the at least one monitoring station.

42. The system of claim 1, further comprising at least one monitoring station, and the at least one monitoring station configured to provide simultaneous video visitations for review by a person at the at least one monitoring station.

43. The system of claim 42, wherein the at least one monitoring station is configured to provide simultaneous review of eight or less video visitations by a single person at the least one monitoring station.

44. The system of claim 43, wherein the first workstation is located in a correctional facility, the first user is an inmate, and the single person is an officer.

45. The system of claim 1, wherein the first workstation is located in an institutional facility housing residents in a controlled manner, and wherein the first user is a resident of the institutional facility.

46. The system of claim 45, wherein the institutional facility is a correctional facility, and wherein the first user is an inmate.

47. A video visitation system comprising:
a first workstation comprising a first camera and a first microphone configured to generate a first complete audio/video feed;
a second workstation comprising a second camera and a second microphone configured to generate a second complete audio/video feed;
the first and second workstations configured to communicate with one another over at least one network, whereby a video visitation may be conducted between a first user at the first workstation and a second user at the second workstation; and
at least one processor-based audio/video element configured to remove at least a portion of at least one of the first and second complete audio/video feeds;
wherein each of the first and second complete audio/video feeds comprise a video feed having a series of successive frames, and wherein the at least one processor-based audio/video element is configured to remove frames from at least one of the first and second video feeds; and
wherein each of the first and second complete audio/video feeds comprises an audio feed corresponding to the video feed, and the at least one processor-based audio/video element is configured to monitor the audio feed to determine the frames to be removed.

48. The video visitation system of claim 47, wherein the at least one processor-based audio/video element is configured to dynamically adjust the removal of the frames based on network analytic considerations.

49. The video visitation system of claim 47, wherein the at least one processor-based audio/video element is configured to adjust the removed of the frames based on a time of day that the first and second workstations are in use.

50. The video visitation system of claim 47, wherein the at least one processor-based audio/video element is configured to remove a portion of the audio feed.

51. The video visitation system of claim 50, wherein the at least one processor-based audio/video element is configured to remove a portion of the audio feed corresponding to the removed video frames.

52. The video visitation system of claim 47, wherein the at least one processor-based audio/video element is configured to remove a portion of the audio that does not correspond to the removed video frames, and the at least one processor-based audio/video element is configured to delay one of the audio and video feeds with the portions removed to obtain synchronicity of the audio and video feeds with the portions removed.

53. A video visitation system comprising:
a first workstation comprising a first camera and a first microphone configured to generate a first complete audio/video feed;
a second workstation comprising a second camera and a second microphone configured to generate a second complete audio/video feed;
the first and second workstations configured to communicate with one another over at least one network, whereby a video visitation may be conducted between a first user at the first workstation and a second user at the second workstation; and
at least one processor-based audio/video element configured to remove at least a portion of at least one of the first and second complete audio/video feeds;
wherein each of the first and second complete audio/video feeds comprise a video feed having a series of successive frames, and wherein the at least one processor-based audio/video element is configured to remove frames from at least one of the first and second video feeds; and
wherein the at least one processor-based audio/video element is configured to dynamically adjust the removal of the frames based on network analytic considerations.

54. The video visitation system of claim 53, wherein the at least one processor-based audio/video element is configured to monitor the audio feed to determine the frames to be removed.

55. The video visitation system of claim 53, wherein the at least one processor-based audio/video element is configured to adjust the removed of the frames based on a time of day that the first and second workstations are in use.

56. The video visitation system of claim 53, wherein the at least one processor-based audio/video element is configured to remove a portion of the audio feed.

57. The video visitation system of claim 56, wherein the at least one processor-based audio/video element is configured to remove a portion of the audio feed corresponding to the removed video frames.

58. The video visitation system of claim 56, wherein the at least one processor-based audio/video element is configured to remove a portion of the audio that does not correspond to the removed video frames, and the at least one processor-based audio/video element is configured to delay one of the audio and video feeds with the portions removed to obtain synchronicity of the audio and video feeds with the portions removed.

59. A video visitation system comprising:
a first workstation comprising a first camera and a first microphone configured to generate a first complete audio/video feed;
a second workstation comprising a second camera and a second microphone configured to generate a second complete audio/video feed;
the first and second workstations configured to communicate with one another over at least one network, whereby a video visitation may be conducted between a first user at the first workstation and a second user at the second workstation; and
at least one processor-based audio/video element configured to remove at least a portion of at least one of the first and second complete audio/video feeds;
wherein each of the first and second complete audio/video feeds comprise a video feed having a series of successive frames, and wherein the at least one processor-based audio/video element is configured to remove frames from at least one of the first and second video feeds; and
wherein the at least one processor-based audio/video element is configured to adjust the removal of the frames based on a time of day that the first and second workstations are in use.

60. The video visitation system of claim 59, wherein the at least one processor-based audio/video element is configured to remove a portion of the audio feed.

61. The video visitation system of claim 60, wherein the at least one processor-based audio/video element is configured to remove a portion of the audio feed corresponding to the removed video frames.

62. The video visitation system of claim 59, wherein the at least one processor-based audio/video element is configured to remove a portion of the audio that does not correspond to the removed video frames, and the at least one processor-based audio/video element is configured to delay one of the audio and video feeds with the portions removed to obtain synchronicity of the audio and video feeds with the portions removed.

63. A video visitation system comprising:
a first workstation comprising a first camera and a first microphone configured to generate a first complete audio/video feed;
a second workstation comprising a second camera and a second microphone configured to generate a second complete audio/video feed;
the first and second workstations configured to communicate with one another over at least one network, whereby a video visitation may be conducted between a first user at the first workstation and a second user at the second workstation; and
at least one processor-based audio/video element configured to remove at least a portion of at least one of the first and second complete audio/video feeds;
wherein each of the first and second complete audio/video feeds comprise a video feed having a series of successive frames, and wherein the at least one processor-based audio/video element is configured to remove frames from at least one of the first and second video feeds; and
wherein the at least one processor-based audio/video element is configured to remove a portion of the audio that does not correspond to the removed video frames, and the at least one processor-based audio/video element is configured to delay one of the audio and video feeds with the portions removed to obtain synchronicity of the audio and video feeds with the portions removed.

64. A video visitation method, the method implemented with a system including a first workstation comprising a first camera and a first microphone configured to provide a first complete audio/video feed, a second workstation comprising a second camera and a second microphone configured to provide a second complete audio/video feed, the first and second workstations configured to communicate with one another over at least one network and provide a video visitation between a first user and a second user, at least one processor-based audio/video element and a plurality of monitoring stations at different locations remote from at least one of the first and second workstations, the method comprising:
removing, with the at least one processor-based audio/video element, at least a portion of at least one of the first and second complete audio/video feeds; and
dynamically adjusting the audio video feeds of at least one of the first and second workstations to facilitate monitoring of the video visitation by a person at each of the plurality of monitoring stations.

* * * * *